(12) United States Patent
Belmonte et al.

(10) Patent No.: US 9,073,155 B2
(45) Date of Patent: Jul. 7, 2015

(54) METHOD OF FABRICATING A TURBINE ENGINE DRUM

(75) Inventors: Olivier Belmonte, Perthes en Gatinais (FR); Lionel Rene Henri Weller, Champcueil (FR)

(73) Assignee: SNECMA, Paris (FR)

( * ) Notice: Subject to any disclaimer, the term of this patent is extended or adjusted under 35 U.S.C. 154(b) by 129 days.

(21) Appl. No.: 13/814,375

(22) PCT Filed: Jul. 20, 2011

(86) PCT No.: PCT/FR2011/051753
§ 371 (c)(1),
(2), (4) Date: Feb. 5, 2013

(87) PCT Pub. No.: WO2012/017168
PCT Pub. Date: Feb. 9, 2012

(65) Prior Publication Data
US 2013/0133194 A1 May 30, 2013

(30) Foreign Application Priority Data
Aug. 6, 2010 (FR) ...................... 10 56504

(51) Int. Cl.
*B23P 15/04* (2006.01)
*B23P 19/00* (2006.01)
*B23K 20/12* (2006.01)
*B23P 15/00* (2006.01)
*F01D 5/06* (2006.01)

(52) U.S. Cl.
CPC ............ *B23P 19/00* (2013.01); *Y10T 29/49229* (2015.01); *B23K 20/129* (2013.01); *B23K 2201/001* (2013.01); *B23K 2203/18* (2013.01); *B23P 15/006* (2013.01); *F01D 5/063* (2013.01); *Y02T 50/673* (2013.01); *F05D 2230/232* (2013.01)

(58) Field of Classification Search
USPC ................. 29/889, 889.2, 889.21; 219/117.1, 219/78.02; 228/112.1; 416/200 R, 244 R
See application file for complete search history.

(56) References Cited

U.S. PATENT DOCUMENTS 3,772,763 A * 11/1973 Henson et al. ............. 29/888.08
3,894,324 A    7/1975 Holzapfel et al.
4,483,054 A   11/1984 Ledwith (Continued)

FOREIGN PATENT DOCUMENTS

| EP | 1 927 722 | 6/2008 |
| FR | 2 150 094 | 3/1973 |
| FR | 2 925 106 | 6/2009 |

OTHER PUBLICATIONS

International Search Report Issued Oct. 7, 2011 in PCT/FR11/51753 Filed Jul. 20, 2011.

*Primary Examiner* — Richard Chang
(74) *Attorney, Agent, or Firm* — Oblon, McClelland, Maier & Neustadt, L.L.P.

(57) ABSTRACT

A method of fabricating a turbine engine drum including at least two rotor disks, the method including: positioning the two disks on a common axis spaced apart from each other and in a predetermined angular position relative to each other; placing a wall forming a body of revolution between the two disks coaxially about their common axis; driving the wall in rotation about its axis; and moving the disks axially towards the wall so as to put the disks into contact with ends of the wall and thus welding the disks to the wall by inertial friction welding.

4 Claims, 1 Drawing Sheet

(56) References Cited

U.S. PATENT DOCUMENTS

| | | |
|---|---|---|
| 4,743,165 A | 5/1988 | Ulrich |
| 5,519,182 A * | 5/1996 | Linzell ..................... 219/117.1 |
| 8,002,526 B2 * | 8/2011 | Vettese et al. ............. 416/200 R |
| 2008/0124210 A1 | 5/2008 | Wayte et al. |
| 2009/0155062 A1 | 6/2009 | Guimbard et al. |
| 2009/0265933 A1 | 10/2009 | Schreiber |

* cited by examiner

METHOD OF FABRICATING A TURBINE ENGINE DRUM

BACKGROUND

The present invention relates to a method of fabricating a turbine engine drum, and to such a drum forming part of a low-pressure turbine.

In the prior art, a low-pressure turbine drum comprises at least two rotor disks on a common axis that are connected to each other by a substantially cylindrical or frustoconical wall forming a body of revolution that is coaxial about the common axis. Each drum has an upstream flange and a downstream flange for fastening the drum to upstream and downstream drums, respectively. The radially outer periphery of each disk has slots for axially receiving and radially retaining the roots of rotor blades.

Radially extending wipers are formed on the outer surface of the wall and they co-operate by rubbing against blocks of abradable material to form labyrinth type seals. These blocks of material are carried by the radially inner peripheries of stator vanes that are interposed between the rotor blades.

The low-pressure turbine drum may be made by welding an upstream disk to a downstream disk carrying the wall by using inertial friction welding. The first step consists in forming the slots in the outer periphery of the upstream disk, and then a second step consists in setting the upstream disk carrying the wall into rotation and in applying axial force to the second disk so that the free end of the wall becomes welded with the first disk by inertial friction welding. In a last step, the slots are made in the outer periphery of the second disk by broaching.

In order to improve the performance of the turbine and reduce its sound emission, it is known to establish multi-stage aerodynamic coupling between two consecutive sets of rotor blades that are spaced apart from each other by a set of stator vanes (a technique known as "clocking"). This coupling consists in angularly positioning the set of blades on the downstream rotor relative to the set of blades on the upstream rotor in such a manner that the wakes formed at the trailing edges of the upstream blades impact against the leading edges of the downstream blades with some specified tolerance. Thus, so far the drum is concerned, this leads to the slots in the downstream disk being broached in such a manner that they are offset in a circumferential direction through a certain angle relative to the slots in the upstream disk. Such aerodynamic coupling is described in detail in prior patent application FR 07/08710 in the name of the Applicant.

Nevertheless, such determined angular positioning of the two disks of a drum is possible only when the outer periphery of the downstream disk presents a diameter that is significantly greater than that of the upstream disk so that it is possible to perform broaching therein after welding. In configurations in which both disks have substantially the same diameter, it is impossible to perform broaching in the second disk after it has been welded because of the length of the broaching tool. Under such circumstances, the broaching operation must be performed before performing friction welding, and it is no longer possible to achieve accurate angular positioning of the slots in the second disk relative to the slots in the first disk.

Furthermore, in the prior art, the wall forming a body of revolution is made of the same material as the disks, e.g. such as NC19FeNb, which means that it is not possible to achieve accurate control over the collapse of material in the weld zone (i.e. the quantity of material that deforms under the effect of temperature). This leads to inaccuracy in the relative axial positioning of the two disks.

BRIEF SUMMARY

A particular object of the invention is to provide a solution to at least some of these problems that is simple, effective, and inexpensive.

The method provides a method of fabricating a drum that makes it possible to achieve predetermined angular positioning of two disks of a drum, regardless of the radial sizes of the disks.

To this end, the invention provides a method of fabricating a turbine engine drum, the drum comprising at least two rotor disks on a common axis, each having slots in its outer periphery for receiving blade roots, the method being characterized in that it comprises the steps consisting in:

positioning the two disks on a common axis spaced apart from each other and in a predetermined angular position relative to each other;

placing a wall forming a body of revolution between the two disks coaxially about their common axis;

driving the wall in rotation about its axis; and moving the disks axially towards the wall while maintaining them in their predetermined angular position relative to each other so as to put the disks into contact with the ends of the wall and thereby weld the disks to the wall by inertial friction welding.

Unlike the prior art, only the wall constituting a body of revolution is driven in rotation, thus making it possible for the two disks to be angularly positioned relative to each other very accurately and to be maintained in this angular position. It is thus possible to achieve aerodynamic coupling between the disks of a drum regardless of their radial dimensions, and in particular when the two disks are of similar radial dimensions.

Advantageously, the welding step comprises a first stage in which the disks rub against the ends of the rotating wall during the time needed for the weld zones to reach their forging temperature, and a second stage in which axial thrust is applied to each of the disks in order to perform the welding.

This two-stage welding step makes it possible firstly to heat up the zones for welding by the ends of the wall rubbing against the disks, and then to secure the wall to the disks by applying axial thrust. In this way, it is possible to obtain control over the relative axial positioning of the disks that is better than in the prior art.

According to another characteristic of the invention, after the disks have been welded, the method consists in machining the weld zones in order to return their thickness to a predetermined value.

According to yet another characteristic of the invention, the method is performed on disks that do not have blades fitted thereto.

The invention also provides a turbine engine drum such as a low-pressure turbine drum, comprising two rotor disks on a common axis connected to each other by a wall forming a body of revolution, the drum being characterized in that the ends of the wall are fastened to the rotor disks by inertial friction welding by performing the method as described above in such a manner that the disks are in a predetermined position relative to each other.

Advantageously, the wall is made of a material that is different from the material of the rotor disks. This is made possible by the fact that the wall constituting a body of revolution is initially not secured to either of the two disks. This makes it possible for the wall to be made out of a material that is less expensive than that used for making the disks, e.g. such as a nickel-based alloy that satisfies less strict mechanical criteria than the alloy used for making the disks.

According to yet another characteristic of the invention, the disks and the wall are made out of nickel-based metal alloy.

The invention also provides a turbine engine such as an airplane turboprop or turbojet, which engine includes at least one drum as described above.

BRIEF DESCRIPTION OF THE DRAWINGS

The invention can be better understood and other details, advantages, and characteristics of the invention appear on reading the following description made by way of non-limiting example and with reference to the accompanying drawing, in which.

DETAILED DESCRIPTION

Figure 1:
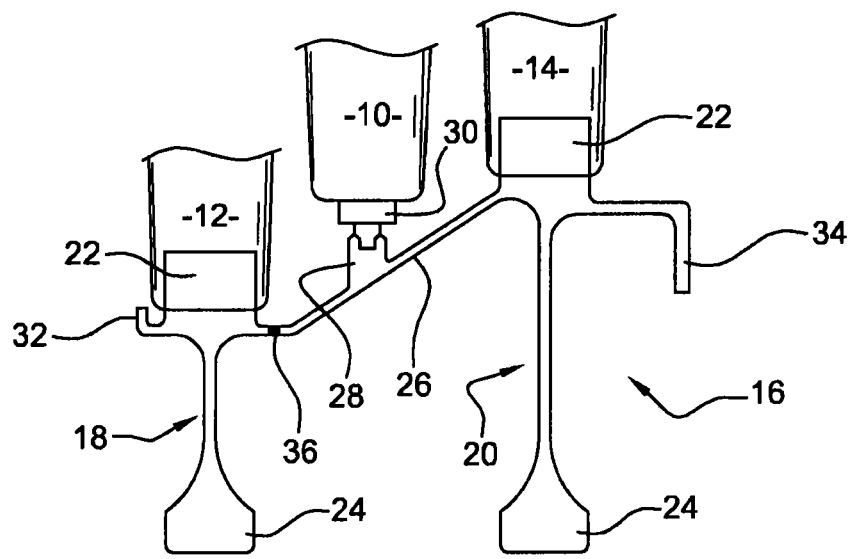
FIGS. 1 and 2 are fragmentary section views of two prior art low-pressure turbine drums.

In conventional manner, a turbine engine comprises from upstream to downstream: low-pressure and high-pressure compressors, a combustion chamber ejecting burnt gas into a high-pressure turbine, and then into a low-pressure turbine.

The low-pressure turbine comprises a plurality of rows of stationary stator vanes 10 arranged in alternation with movable rotor blades 12.

The turbine rotor is made up of a plurality of drums 16 fastened to one another. Each drum comprises two disks on a common axis, an upstream disk 18 and a downstream disk 20, each having slots 22 in its outer periphery for axially receiving and radially retaining the roots of rotor blades 12, 14. Each disk 18, 20 includes a balance hub 24 in its radially inner portion.

The two disks 18 and 20 are connected to each other by a wall 26 forming a body of revolution that includes wipers 28 on its outer surface for co-operating with a block of abradable material 30 carried by the radially inner ends of a row of stationary stator vanes 10 that are interposed between two rows of movable blades 12 and 14 carried by the disks 18 and 20. The radially outer ends of the stationary vanes 10 are carried by an outer annular casing of the turbine (not shown).

The drum 16 includes a flange 32 formed on the upstream disk 18 and extending upstream, and a downstream flange 34 formed on the downstream disk 20 and extending downstream, the flanges serving to fasten the drum 16 to upstream and downstream drums, respectively.

In the prior art, in order to make a drum 16, the upstream disk 18 is subjected to a broaching operation in order to form the slots 22 in its outer periphery, and then it is held stationary while the downstream disk 20 carrying the wall 26 is driven in rotation and moved axially so that the upstream free end of the wall 26 comes into contact with the upstream disk in order to provide a bead of welding 36 by inertial friction. The downstream disk 20 is then subjected to a broaching operation in order to form its slots 22 in its outer periphery.

Performing the broaching in the downstream disk 20 after it has been fastened to the upstream disk 18 makes it possible to ensure that the upstream and downstream slots 22 are angularly positioned relative to one another in a predetermined position that is selected so as to achieve multi-stage aerodynamic coupling as mentioned above.

Nevertheless, broaching can be performed after welding only with a drum 16 of the kind shown in FIG. 1, where the upstream disk 28 has a diameter that is considerably smaller than the diameter of the downstream disk 20.

Figure 2:
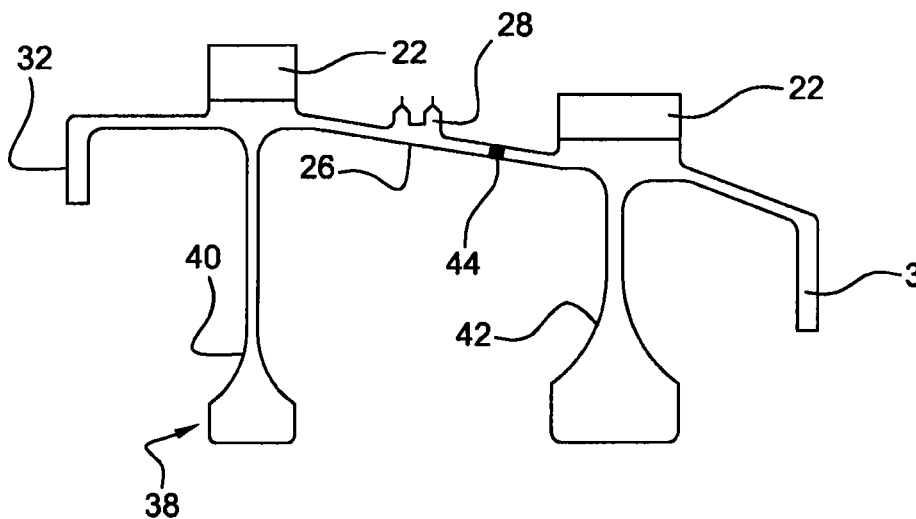

With two disks 40 and 42 that are of similar diameter, as shown in FIG. 2, it is impossible to perform broaching on one of the disks after welding, which means that it is not possible to optimize the performance of the turbine and reduce its sound emission by multi-stage aerodynamic coupling.

The invention enables this drawback to be remedied as well as those mentioned above by using a wall forming a body of revolution that is independent of the disks, with this wall being caused to rotate and with the two disks being put into contact with the ends of the wall by moving the disks axially so as to weld them to the wall by inertial friction.

Figure 3:
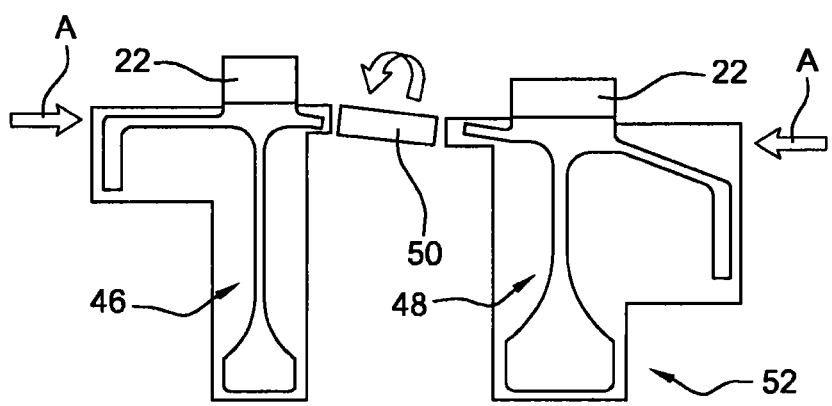
FIG. 3 is a fragmentary diagrammatic view showing the assembly of a low-pressure turbine drum of the invention.

The method of the invention as shown diagrammatically in FIG. 3 consists in placing two disks 46 and 48 that do not have blades on a common axis and at a distance apart from each other. Each disk 46, 48 has slots 22 in its outer periphery, and the disks 46, 48 are positioned angularly relative to each other so that the slots 22 of the upstream disk 46 are offset in a circumferential direction through a determined angle relative to the slots 22 in the upstream disk 48 in order to optimize the performance of the engine.

In a second step, a wall 50 forming a body of revolution is placed between the two disks 46 and 48 on their common axis and it is driven in rotation about its axis.

The two disks 46 and 48 are then welded to the axial ends of the wall 50. This welding step takes place in two stages, the first of which consists in moving the disks 46 and 48 towards the ends of the wall 50 until they rub against those ends. This first stage serves to increase the temperature of the weld zones progressively up to their forging temperature. In a second stage, axial thrust (arrows A) is applied to the two disks 46 and 48 so as to press them against the wall 50 and thus perform welding by inertial friction.

By dissociating the movements in rotation and in translation over two different parts, i.e. by no longer axially moving the rotating part, it is possible to guarantee better control over the material that is consumed in the welding zone and thus to achieve better axial positioning of the two disks 46 and 48 relative to each other. This is further improved by performing the welding step in two distinct stages, as described above.

The method of the invention leads to weld beads being formed at the welded ends of the wall 50 and to an increase in the thickness of this wall. The wall can then be machined in order to return its thickness to a predetermined value.

In certain embodiments, the disks 46 and 48 are made of nickel-based alloys that are known for their ability to withstand high temperatures of the kind that are to be found in a turbine. Nevertheless, that type of material is very expensive. The method of the invention makes it possible to use a wall 50 that is made of a material that is different from the material of the turbine disks 46 and 48. Thus, the wall 50 may be made of a material that is less expensive than the material used for the disks 46 and 48. Alternatively, it is possible to make the upstream and downstream disks and the wall forming a body of revolution out of the same material, such as for example the alloy NC19FeNb. Nevertheless, the alloy used for making the wall may comply with mechanical criteria that are less severe, as a result of being subjected to fewer treatment operations, e.g. heat treatment operations, than those to which the alloy used for making the disks is subjected.

Although the method of the invention is described with reference to a low-pressure turbine drum 52, it is equally applicable to a turbine engine compressor such as a high-pressure compressor in which the rotor disks are connected together in a similar manner.

The invention claimed is:

1. A method of fabricating a turbine engine drum, the drum including at least two rotor disks on a common axis, each of the two disks having slots in its outer periphery for receiving blade roots, the method comprising:

positioning the two disks on the common axis spaced apart from each other and in a predetermined angular position relative to each other;

placing a wall forming a body of revolution between the two disks coaxially about the common axis;

driving the wall in rotation about its axis while the two disks are in contact with the wall;

after the driving the wall, moving the disks axially towards the wall while maintaining the disks in the predetermined angular position relative to each other so as to put the disks into contact with ends of the wall and thereby weld the disks to the wall by inertial friction; and the welding comprises a first stage in which the disks rub against the ends of the wall during a time needed for the weld zones to reach their forging temperature, and a second stage in which axial thrust is applied to each of the disks to perform the welding, thereby forming the turbine engine drum.

2. The method according to claim 1, further comprising machining zones that are welded to return their thickness to a predetermined value.

3. The method according to claim 1, wherein the disks do not have blades fitted thereto during the inertial friction welding.

4. The method according to claim 1, further comprising:

forming the slots in the outer periphery of each of the two disks before the positioning the two disks on the common axis.

* * * * *